United States Patent
Shimoda et al.

(10) Patent No.: US 8,681,398 B2
(45) Date of Patent: Mar. 25, 2014

(54) IMAGE SENSOR UNIT AND IMAGE READER

(75) Inventors: Shuuichi Shimoda, Saitama (JP); Hidemasa Yoshida, Saitama (JP); Hideo Kiyota, Saitama (JP); Hiroyuki Murakami, Saitama (JP)

(73) Assignee: Canon Components, Inc. (JP)

( * ) Notice: Subject to any disclaimer, the term of this patent is extended or adjusted under 35 U.S.C. 154(b) by 111 days.

(21) Appl. No.: 13/338,418

(22) Filed: Dec. 28, 2011

(65) Prior Publication Data

US 2012/0162727 A1 Jun. 28, 2012

(30) Foreign Application Priority Data

Dec. 28, 2010 (JP) ................................ 2010-293227

(51) Int. Cl.
*H04N 1/04* (2006.01)
(52) U.S. Cl.
USPC ........................... 358/475; 358/474; 358/509
(58) Field of Classification Search
USPC ......... 358/474, 513, 514, 505, 475, 509, 496, 358/497
See application file for complete search history.

(56) References Cited

U.S. PATENT DOCUMENTS

| | | | |
|---|---|---|---|
| 5,119,232 A | | 6/1992 | Daley et al. |
| 5,166,832 A | | 11/1992 | Zychowicz |
| 5,182,445 A | | 1/1993 | Yamashita |
| 5,263,077 A | * | 11/1993 | Cowan et al. ................. 378/173 |
| 5,864,408 A | | 1/1999 | Kumashiro |
| 5,953,133 A | * | 9/1999 | Fujimiya et al. ............... 358/474 |
| 6,166,832 A | | 12/2000 | Fujimoto |
| 6,724,503 B1 | * | 4/2004 | Sako et al. ..................... 358/483 |
| 7,190,493 B2 | | 3/2007 | Maki et al. |
| 7,284,891 B2 | | 10/2007 | Saito et al. |
| 7,538,911 B2 | | 5/2009 | Sakurai et al. |
| 7,593,143 B2 | * | 9/2009 | Herloski ....................... 358/474 |
| 7,722,223 B2 | | 5/2010 | Saito et al. |

(Continued)

FOREIGN PATENT DOCUMENTS

| EP | 0 844 784 A2 | 11/1997 |
|---|---|---|
| EP | 1 049 055 A2 | 4/2000 |

(Continued)

OTHER PUBLICATIONS

Specification and drawings for related co-pending U.S. Appl. No. 13/315,747, filed Dec. 9, 2011.

(Continued)

*Primary Examiner* — Negussie Worku
(74) *Attorney, Agent, or Firm* — Rossi, Kimms & McDowell LLP

(57) ABSTRACT

A protruding locking pawl is provided at an end of a light guide which corresponds to a first light input surface. A recessed locking portion is formed in a frame so that the locking pawl can be locked in the locking portion. A light blocking member is slidably loosely inserted into a position where the light blocking member covers a longitudinal end of the light guide which corresponds to a second light input surface. Even if expansion and contraction occurs in the longitudinal direction of the light guide, the design dimensions of a first gap A and a second gap B can be maintained; the first gap A is formed between the first light input surface and a first light source, and the second gap B formed between the second light input surface and a second light source. Therefore, possible leakage current can be prevented.

15 Claims, 10 Drawing Sheets

(56) References Cited

U.S. PATENT DOCUMENTS

| | | | |
|---|---|---|---|
| 7,760,403 | B2 | 7/2010 | Sakurai |
| 7,796,310 | B2* | 9/2010 | Hasegawa et al. ............ 358/488 |
| 7,859,726 | B2 | 12/2010 | Endo et al. |
| 8,018,630 | B2* | 9/2011 | Herloski ...................... 358/475 |
| 8,049,937 | B2* | 11/2011 | Saito ............................ 358/474 |
| 8,228,567 | B2 | 7/2012 | Kim |
| 8,310,737 | B2 | 11/2012 | Nagao et al. |
| 2002/0114152 | A1 | 8/2002 | Fujino et al. |
| 2005/0150956 | A1 | 7/2005 | Ikeda et al. |
| 2005/0195618 | A1 | 9/2005 | Uemura et al. |
| 2006/0008295 | A1 | 1/2006 | Kohchi et al. |
| 2006/0152942 | A1 | 7/2006 | Saito et al. |
| 2007/0285740 | A1 | 12/2007 | Onishi et al. |
| 2008/0068682 | A1 | 3/2008 | Morikawa |
| 2008/0112017 | A1 | 5/2008 | Nagasaka |
| 2009/0003000 | A1 | 1/2009 | Saito et al. |
| 2009/0027743 | A1 | 1/2009 | Han |
| 2009/0218525 | A1 | 9/2009 | Ikeda et al. |
| 2009/0294630 | A1 | 12/2009 | Saito et al. |
| 2010/0046045 | A1 | 2/2010 | Nagao et al. |
| 2010/0231987 | A1 | 9/2010 | Takeuchi |
| 2012/0154876 | A1 | 6/2012 | Shimoda |
| 2012/0154877 | A1 | 6/2012 | Kisara et al. |
| 2012/0162727 | A1 | 6/2012 | Shimoda et al. |
| 2012/0287484 | A1 | 11/2012 | Shimoda et al. |
| 2013/0009037 | A1 | 1/2013 | Takahashi |
| 2013/0038912 | A1 | 2/2013 | Horiguchi et al. |
| 2013/0038913 | A1 | 2/2013 | Shimoda et al. |
| 2013/0038914 | A1 | 2/2013 | Yoshida et al. |
| 2013/0181311 | A1* | 7/2013 | Sugiyama .................... 257/432 |
| 2013/0265617 | A1* | 10/2013 | Murakami et al. ............ 358/448 |

FOREIGN PATENT DOCUMENTS

| | | |
|---|---|---|
| EP | 1 471 472 A2 | 4/2004 |
| EP | 2 246 825 A1 | 4/2009 |
| JP | 04-150454 | 5/1992 |
| JP | 8-223417 A | 8/1996 |
| JP | 09-214675 A | 8/1997 |
| JP | 10-285330 A | 10/1998 |
| JP | 11-75015 A | 3/1999 |
| JP | 11-084544 A | 3/1999 |
| JP | 2000-324308 | 11/2000 |
| JP | 2001-005122 A | 1/2001 |
| JP | 2001-223852 A | 8/2001 |
| JP | 2001-272677 | 10/2001 |
| JP | 2003-037717 A | 2/2003 |
| JP | 2003-046726 A | 2/2003 |
| JP | 2003-281913 A | 10/2003 |
| JP | 2004-146870 A | 5/2004 |
| JP | 2005-198106 A | 7/2005 |
| JP | 2005-223424 A | 8/2005 |
| JP | 2006-311232 A | 11/2006 |
| JP | 3885088 B2 | 11/2006 |
| JP | 2007-116590 A | 5/2007 |
| JP | 2007-194797 A | 8/2007 |
| JP | 2007-300536 A | 11/2007 |
| JP | 2008-42425 A | 2/2008 |
| JP | 2008-112301 A | 5/2008 |
| JP | 2009-053316 A | 3/2009 |
| JP | 2009-086488 A | 4/2009 |
| JP | 2010-136061 A | 6/2010 |
| JP | 2010213039 A | 9/2010 |
| JP | 2011-124741 A | 6/2011 |
| WO | 97/23991 | 7/1997 |
| WO | 2006/137263 A1 | 12/2006 |
| WO | 2007/077760 A1 | 7/2007 |
| WO | 2008/013234 A1 | 1/2008 |

OTHER PUBLICATIONS

Specification and drawings for related co-pending U.S. Appl. No. 13/328,553, filed Dec. 16, 2011.

Specification and drawings for related co-pending U.S. Appl. No. 13/333,751, filed Dec. 21, 2011.

Office Action issued in Corresponding Japanese Patent Application No. 2010-282128 dated Nov. 6, 2012. related co-pending U.S. Appl. No. 13/328,553.

Extended European Search Report for EP 11194502.8, mail date Dec. 4, Cited in related U.S. Appl. No. 13/333,751.

Japanese Office Action for JP 2011-236415, mail date Nov. 13, 2012. Cited in related U.S. Appl. No. 13/333,751.

Japanese Office Action for corresponding JP 2012-247653, mail date Dec. 11, 2012.

International Search Report for PCT/JP2010/069500, mail date Nov. 30, 2010. Cited in related U.S. Appl. No. 13/519,351. See USPGP Cite 3.

European Search Report issued in EP12179608.0, dated Nov. 21, 2012. Cited in related U.S. Appl. No. 13/467,357.

European Office Action issued in EP12167240.6, dated May 17, 2013. Cited in related U.S. Appl. No. 13/467,357.

Korean Office Action issued in KR10-2012-49430, dated Jun. 27, 2013. Cited in related U.S. Appl. No. 13/467,357.

Japanese Office Action issued in JP2012-087401, dated Apr. 30, 2013. Cited in related U.S. Appl. No. 13/467,357.

Japanese Office Action issued in application No. JP2012-163536, dated Sep. 17, 2013. Cited in related U.S. Appl. No. 13/570,970.

Japanese Office Action cited in Japanese counterpart application No. JP2010-293227, dated Dec. 11, 2012. Partial English Summary enclosed.

* cited by examiner

IMAGE SENSOR UNIT AND IMAGE READER

CROSS-REFERENCE TO RELATED APPLICATIONS

This application is based upon and claims the benefit of priority of the prior Japanese Patent Application No. 2010-293227, filed on Dec. 28, 2010, the entire contents of which are incorporated herein by reference.

BACKGROUND OF THE INVENTION

1. Field of the Invention

The present invention relates to a contact image sensor unit and an image reader using the contact image sensor unit.

2. Description of the Related Art

In an image sensor unit with light sources installed at the respective opposite ends of a light guide in a longitudinal direction thereof (main scanning direction), leakage light may result from, for example, a variation in atmospheric temperature and/or atmospheric humidity.

Thus, an image reader (image sensor) described in Japanese Laid-Open Patent Publication No. 2004-146870 has been proposed.

Patent Document 1

Japanese Laid-Open Patent Publication No. 2004-146870

However, disadvantageously, the image sensor described in Japanese Laid-Open Patent Publication No. 2004-146870 has an increased size owing to a light guide cover provided therein to cover the light guide. For an image sensor without a light guide cover, additional components are required, disadvantageously leading to increased costs.

Furthermore, the image sensor may suffer a crack or the like when the light guide expands or contracts as a result of, for example, a variation in atmospheric temperature and/or atmospheric humidity.

SUMMARY OF THE INVENTION

The present invention has been developed in view of the above-described circumstances. An object of the present invention is to provide an image sensor unit that enables possible leakage light to be prevented without the need to increase the size of the image sensor unit and which also enables a light guide to be prevented from suffering a crack, wear, and the like.

The present invention provides an image sensor unit including light sources, a sensor substrate with a plurality of photoelectric conversion elements mounted thereon, a rod-like light guide with the light sources arranged close to respective opposite ends thereof in a longitudinal direction to guide light from the light sources to illuminate an illumination target, an image forming element configured to form light reflected from the illumination target into an image on the sensor substrate, and a support with each of the light sources, the sensor substrate, the light guide, and the image forming element attached thereto, wherein the image sensor unit further includes locking means for allowing one end of the light guide and the support to be locked together, and a light blocking member configured to cover another end of the light guide.

The present invention provides another image sensor unit including light sources, a sensor substrate with a plurality of photoelectric conversion elements mounted thereon, a rod-like light guide with the light sources arranged close to respective opposite ends thereof in a longitudinal direction to guide light from the light sources to illuminate an illumination target, an image forming element configured to form light reflected from the illumination target into an image on the sensor substrate, and a support with each of the light sources, the sensor substrate, the light guide, and the image forming element attached thereto, wherein the image sensor unit further includes locking means for allowing a substantially central portion of the light guide and the support to be locked together, and light blocking members configured to cover the respective opposite ends of the light guide.

The present invention provides an image reader using an image sensor unit including light sources, a sensor substrate with a plurality of photoelectric conversion elements mounted thereon, a rod-like light guide with the light sources arranged close to respective opposite ends thereof in a longitudinal direction to guide light from the light sources to illuminate an illumination target, an image forming element configured to form light reflected from the illumination target into an image on the sensor substrate, and a support with each of the light sources, the sensor substrate, the light guide, and the image forming element attached thereto, the image reader including locking means for allowing one end of the light guide and the support to be locked together and a light blocking member configured to cover another end of the light guide, or locking means for allowing a substantially central portion of the light guide and the support to be locked together, and light blocking members configured to cover the respective opposite ends of the light guide.

DETAILED DESCRIPTION OF THE PREFERRED EMBODIMENTS

Figure 1:
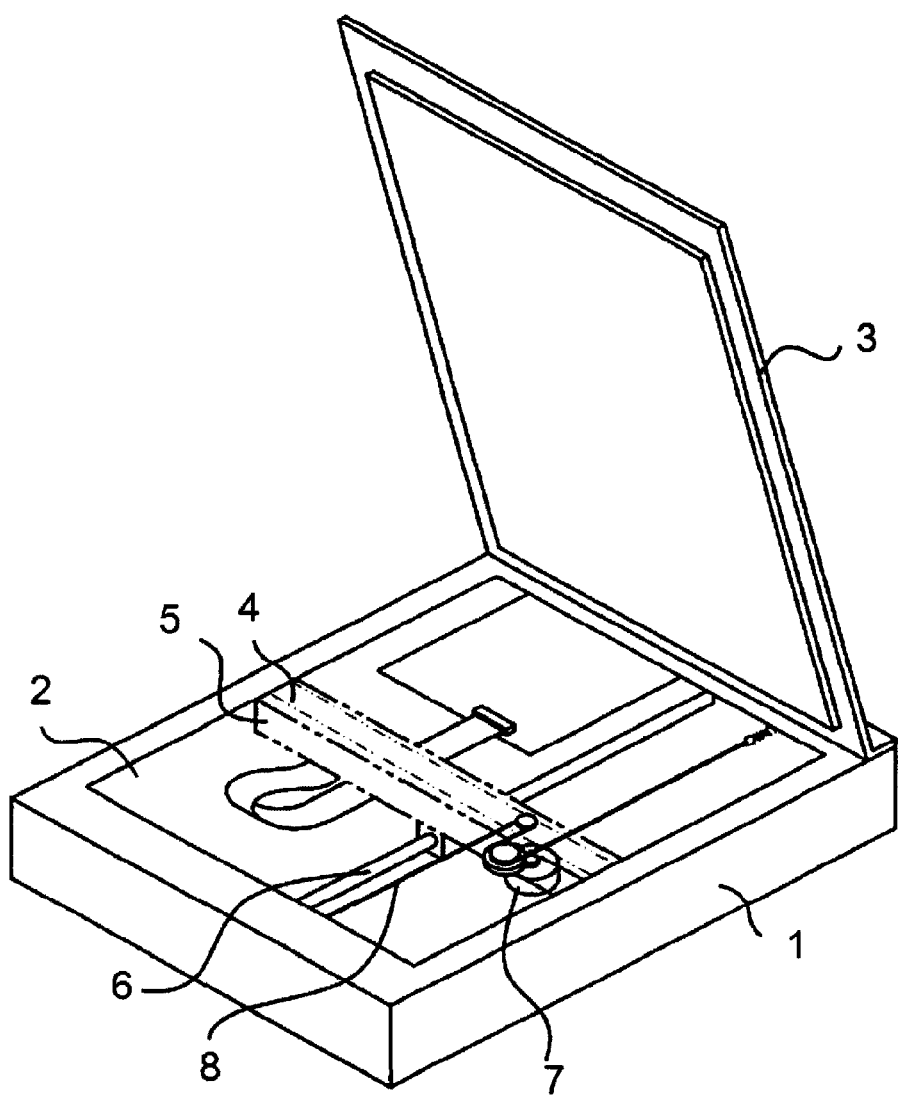
FIG. 1 is a perspective view showing the structure of an image scanner to which the present invention is applicable.

Embodiments of the present invention will be described below. FIG. 1 is a perspective diagram showing the structure of a flatbed scanner (image reader) to which the present invention is applicable.

A housing is shown by reference numeral 1. Platen glass is shown by reference numeral 2 and formed of a transparent glass plate. The platen glass is provided in the housing 1 to serve as a document loading section. A platen cover is shown by reference numeral 3 and can be opened and closed so as to cover a document loaded on the platen glass 2 as an illumination target.

An image sensor unit is shown by reference numeral 4 and housed inside the housing 1. The image sensor unit 4 is, for example, a contact image sensor (CIS). A holding member is shown by reference numeral 5 and holds the image sensor unit 4 so as to enclose the image sensor unit 4. A slide shaft is shown by reference numeral 6 and is movable along the platen glass 2. A drive motor is shown by reference numeral 7. A wire is shown by reference numeral 8.

In this configuration, the drive motor 7 is driven to mechanically move the wire 8 attached to the holding member 5. Then, the image sensor unit 4 is moved in a reading direction (sub-scanning direction) along the slide shaft 6.

Figure 2:
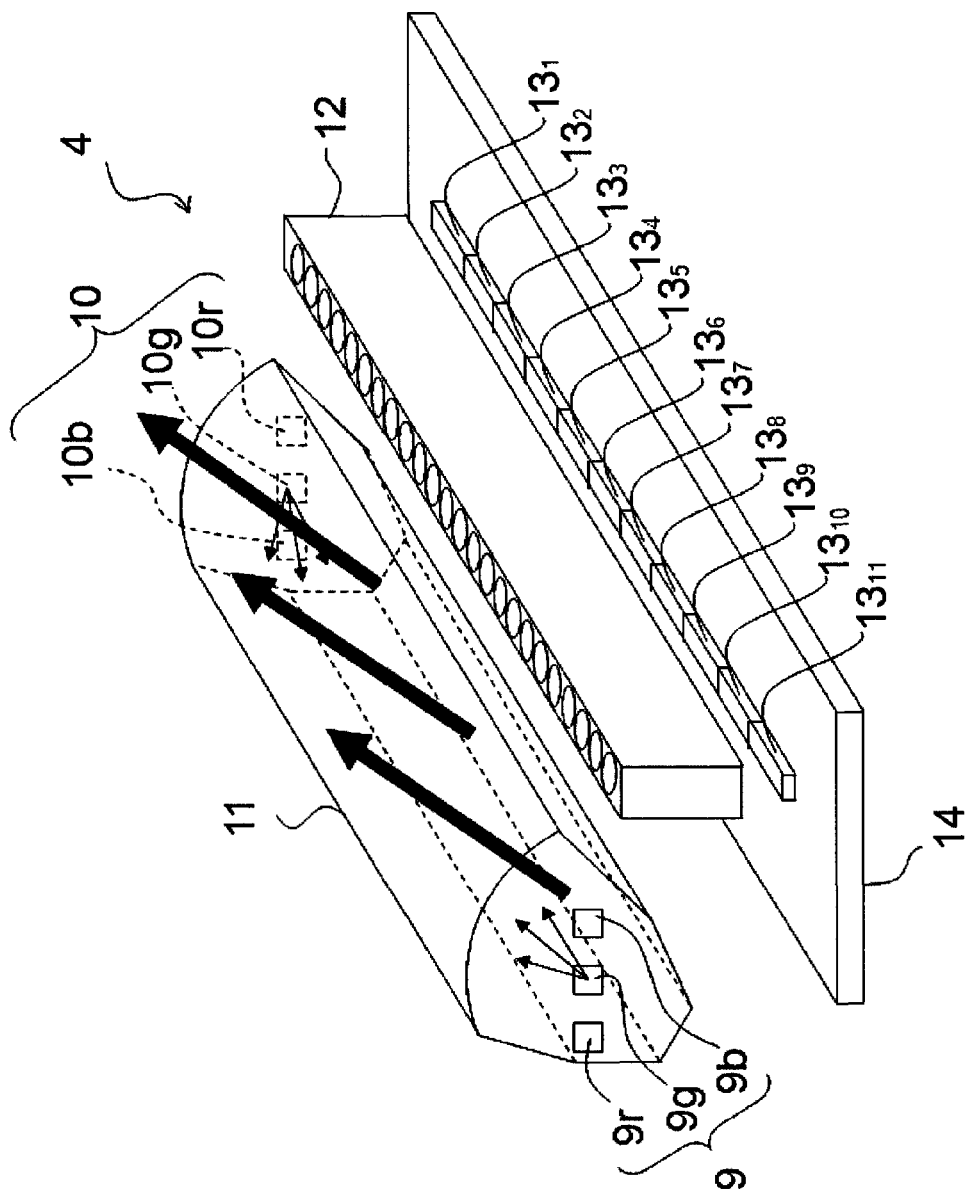
FIG. 2 is a schematic diagram showing an image sensor unit 4.

FIG. 2 is a schematic diagram showing the structure of the image sensor unit 4.

A first light source is shown by reference numeral 9 and used to illuminate a document. The first light source 9 includes, for example, light emitting elements 9r, 9g, and 9b formed of LEDs with respective emission wavelengths for three colors including red, green, and blue (hereinafter simply referred to as RGB). The light emitting elements 9r, 9g, and 9b are sequentially driven to emit light, thus illuminating a document.

Furthermore, a second light source is shown by reference numeral 10 and used to illuminate a document. The second light source 10 includes, for example, light emitting elements 10r, 10g, and 10b formed of LEDs with respective emission wavelengths for three colors including red, green, and blue. The light emitting elements 10r, 10g, and 10b are sequentially driven to emit light, thus illuminating a document.

The first light source 9 and the second light source 10 may each be a white light source.

A rod-like light guide is shown by reference numeral 11 and guides irradiation light the first light source 9 and the second light source 10 to a document. The light guide 11 has a substantially uniform shape in a main scanning direction.

The light guide 11 is formed of a transparent resin such as acrylic by ejection molding.

The ejection molding involves forming a molded article by ejecting a melted resin from a nozzle through an outflow port (gate) into a cavity portion where the resin is formed into the molded article.

Furthermore, the first light source 9 and the second light source 10 are arranged close to the respective opposite ends of the light guide 11 in a longitudinal direction thereof and away from the respective end surfaces of the light guide 11 by the lengths of a first gap A and a second gap B, respectively.

A rod lens array is shown by reference numeral 12 and serves as an image forming element. The rod lens array 12 includes a plurality of erecting normal-size image-forming lens elements arranged therein.

Photoelectric conversion elements are shown by reference numeral 13 and convert an image into which reflected light (document image) is formed by the rod lens array 12, into an electric signal. A sensor substrate is shown by reference numeral 14 and includes the photoelectric conversion elements $13_k$ (k is a natural number of 1 to 11) mounted thereon.

In the present embodiment, the number of the photoelectric conversion elements $13_k$ is 11. However, the number of the photoelectric conversion elements $13_k$ is not particularly limited.

In the above-described configuration, the image sensor unit 4 emits light at a reading position immediately below the platen glass 2 by sequentially driving the first light source 9 and the light emitting elements 10r, 10g, and 10b provided in the second light source 10 to allow each of the light emitting elements to emit light. The emitted irradiation light impinges, through the light guide 11, on a surface of a document substantially uniformly in form of a line in the main scanning direction. The irradiation light is reflected by the document and focused, by the rod lens array 12, on the photoelectric conversion elements $13_k$ provided on the sensor substrate 14, thus forming an image. The reflected light is converted into an electric signal by the photoelectric conversion elements $13_k$. The electric signal is processed by a signal processing section.

When one scan line of reflected light of all of the RGB colors is read as described above, an operation of reading one scan line in the main scanning direction of the document ends.

After the operation of reading one scan line ends, the image sensor unit 4 moves further in the sub-scanning direction by a distance for one scan line, while performing an operation of reading one scan line in the same manner, with the document irradiated with irradiation light. The reading operation is repeated to scan the entire surface of the document.

Figure 3:
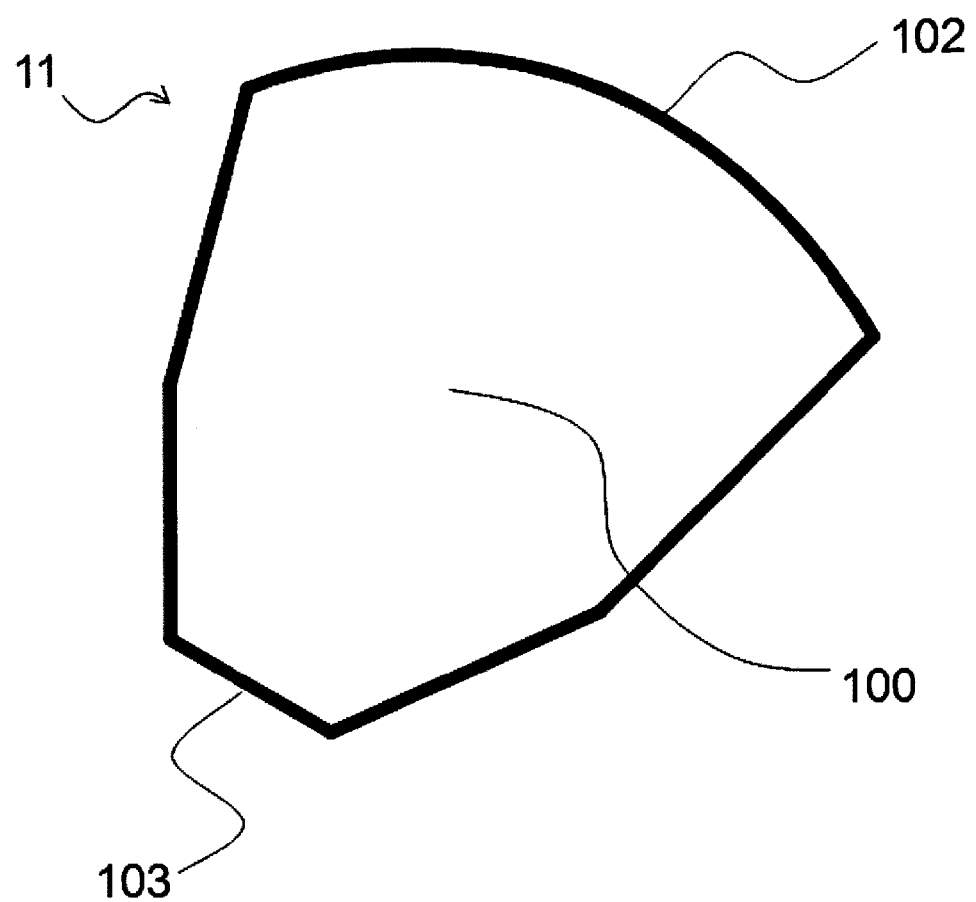
FIG. 3 is a side view showing the structure of a light guide 11.

FIG. 3 is a side view showing the structure of the light guide 11.

The light guide 11 is formed of, for example, a transparent synthetic resin such as acrylic.

A first light input surface is shown by reference numeral 100 and provided on one side end surface of the light guide 11 in a longitudinal direction thereof (main scanning direction). The first light source 9 is arranged close to the first light input surface 100 but away from the first light input surface 100 by the length of the first gap A. That is, irradiation light from the first light source 9 is input to the first light input surface 100.

A second light input surface is shown by reference numeral 101 (not shown in FIG. 3; see FIG. 6 and other relevant figures) and provided on the other side end surface of the light guide 11 which is opposite the first light input surface 100 in the longitudinal direction. The second light source 10 is arranged close to the second light input surface 101 but away from the second light input surface 101 by the length of the second gap B. That is, irradiation light from the second light source 10 is input to the second light input surface 101.

An output surface is shown by reference numeral 102 and provided along the longitudinal direction of the light guide 11. The output surface 102 allows irradiation light from the first light source 9 and the second light source 10 reflected and diffused in the light guide 11 to be output toward the document. The output surface 102 is formed to be convex so as to allow light to be concentrated.

A reflection surface is shown by reference numeral 103 and corresponds to a surface of the light guide 11 which lies opposite the output surface 102. The reflection surface 103 includes, for example, a light diffusion pattern formed of light reflective coating by silk printing or the like. The light diffusion pattern is configured so as to have a distribution density depending on the distance from the light source 10; the light diffusion pattern has a lower distribution density at a shorter distance from the light source 10 and a higher distribution density at a longer distance from the light source 10.

Furthermore, each of the other surfaces of the light guide 11 is a reflection surface.

In this configuration, irradiation light from the first light source 9 and the second light source 10 enters the light guide 11 through the first light input surface 100 and second light input surface 101 provided on the light guide 11. Then, in the light guide 11, the irradiation light propagates through the light guide, while being totally reflected by the reflection surface 103 and the inner surface of the light guide 11. At the same time, the light is diffused, in the light guide 11, by the light diffusion pattern provided on the reflection surface 103, while being output from the output surface 102. As a result, the light impinges on the document substantially uniformly in form of a line in the main scanning direction.

At this time, the irradiation light from the first light source 9 is formed of light entering the light guide 11 through the first light input surface 100 provided on the light guide 11 and light traveling directly toward the document through the first gap A without entering the light guide 11.

Furthermore, the irradiation light from the second light source 10 is formed of light entering the light guide 11 through the second light input surface 101 provided on the light guide 11 and light traveling directly toward the document through the second gap B without entering the light guide 11.

The light traveling from the first light source 9 or the second light source 10 directly toward the document without entering the light guide 11 becomes leakage light. Thus, such leakage light is prevented as follows. For example, a light blocking section is positioned on a way from the light source toward the document to return leakage light from the gap portion to the light guide and/or to absorb the leakage light.

(First Embodiment)

Figure 4:
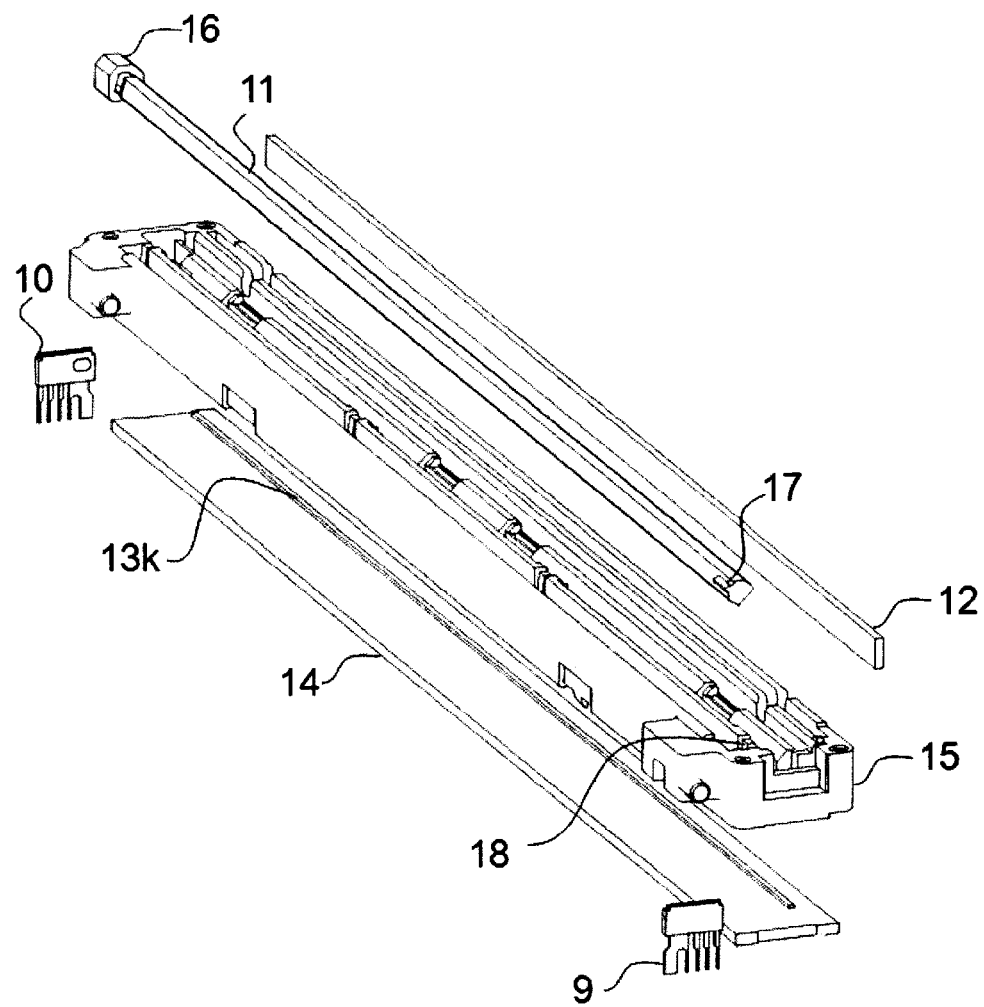
FIG. 4 is a perspective view showing a configuration of the image sensor unit 4 according to a first embodiment.
Figure 5:
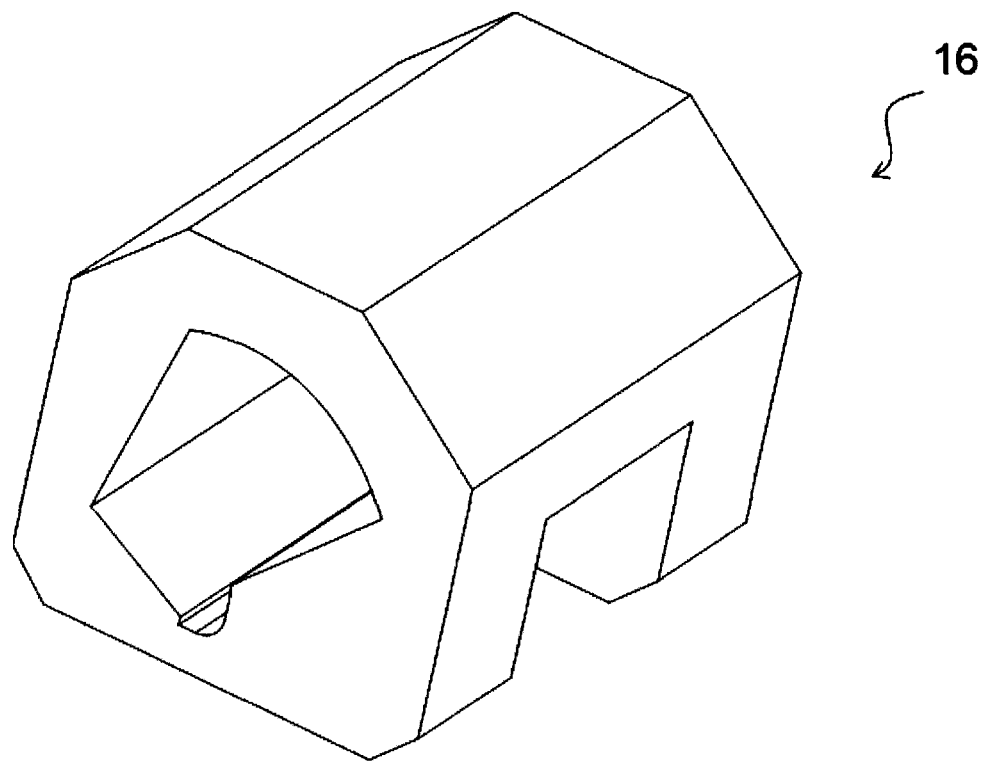
FIG. 5 is a perspective view showing the detailed shape of a light blocking member 16 according to the first embodiment.

FIG. 4 is a perspective view showing a configuration of the image sensor unit 4 according to a first embodiment to which the present invention is applicable. FIG. 5 is a perspective view showing the detailed shape of a light blocking member 16. A frame is shown by reference numeral 15 and serves as a support that supports components of the image sensor unit 4. The following components are attached to and supported by the frame 15: a first light source 9 and a second light source 10, a light guide 11, a rod lens array 12, and a sensor substrate 14 with photoelectric conversion elements $13_k$ mounted thereon.

The light blocking member is shown by reference numeral 16. The light blocking member 16 includes an opening shape substantially similar to a cross-sectional shape of the light guide 11 in the longitudinal direction thereof. The light blocking member 16 is shaped like a cylinder into which the light guide 11 can be inserted.

The light blocking member 16 is positioned so as to cover the end of the light guide 11 which is located closer to a second light input surface 101 in the longitudinal direction of the light guide 11. The light blocking member 16 fixed to the frame 15 by a predetermined fixation method.

A protruding locking pawl is shown by reference numeral 17 and provided integrally with the end of the light guide 11 which corresponds to a first light input surface 100. The locking pawl 17 is formed to protrude from the side surface between an output surface 102 and a reflection surface 103 in a direction orthogonal to the longitudinal direction of the light guide 11. A recessed locking portion is shown by reference numeral 18 and formed at the end of a light guide holding section 19 provided in the frame 15 whose end is closer to the second light source 10. Locking the protruding locking pawl 17 in the recessed locking portion 18 serves as locking means for positioning and fitting the light guide 11 in the light guide holding section 19 provided in the frame 15. Thus, when the light guide 11 is attached to the frame 15, the end of the light guide 11 which includes the locking pawl 17 serves as a fixed end, whereas the other end serves as a free end.

At this time, the light blocking member 16 is slidably loosely inserted into a position where the light blocking member 16 covers the longitudinal end of the light guide 11 which corresponds to the second light input surface 101.

In this configuration, if the ends of the light guide 11 are housed in the light blocking member 16, the light blocking member 16 is interposed between the light guide 11 and the frame 15. This allows the light guide 11 to slide freely around each end thereof via an air layer C, together with the light blocking member 16.

At this time, the air layer C prevents light from being absorbed by a contact surface formed by the close contact between the light blocking member 16 and the light guide 11. This allows the output surface 102 at the end of the light guide 11 covered with the light blocking member 16 to be used as a reflection surface. Thus, light from the second light source 10 can be efficiently guided inside the light guide 11.

Suppressing the backlash between the locking pawl 17 and the locking portion 18 enables a variation in the dimension of the first gap A to be reduced. Thus, the clearance between the locking pawl 17 and the locking portion 18 is preferably minimized.

Furthermore, the light blocking member 16 is formed of a synthetic resin with a self-lubricating property, for example, ultrahigh molecular weight polyethylene, polyacetal, polyamide, or polybutylene terephthalate. Alternatively, the light blocking member 16 is formed of a synthetic resin containing a solid lubricant with a self-lubricating property, for example, a synthetic resin coated with a fluorine resin, molybdenum disulfide, or the like.

Here, the self-lubricating property refers to a property of a material which allows friction and wear to be reduced without the use of any other lubricant or the like owing to the lubricating property of the material itself.

Figure 6:
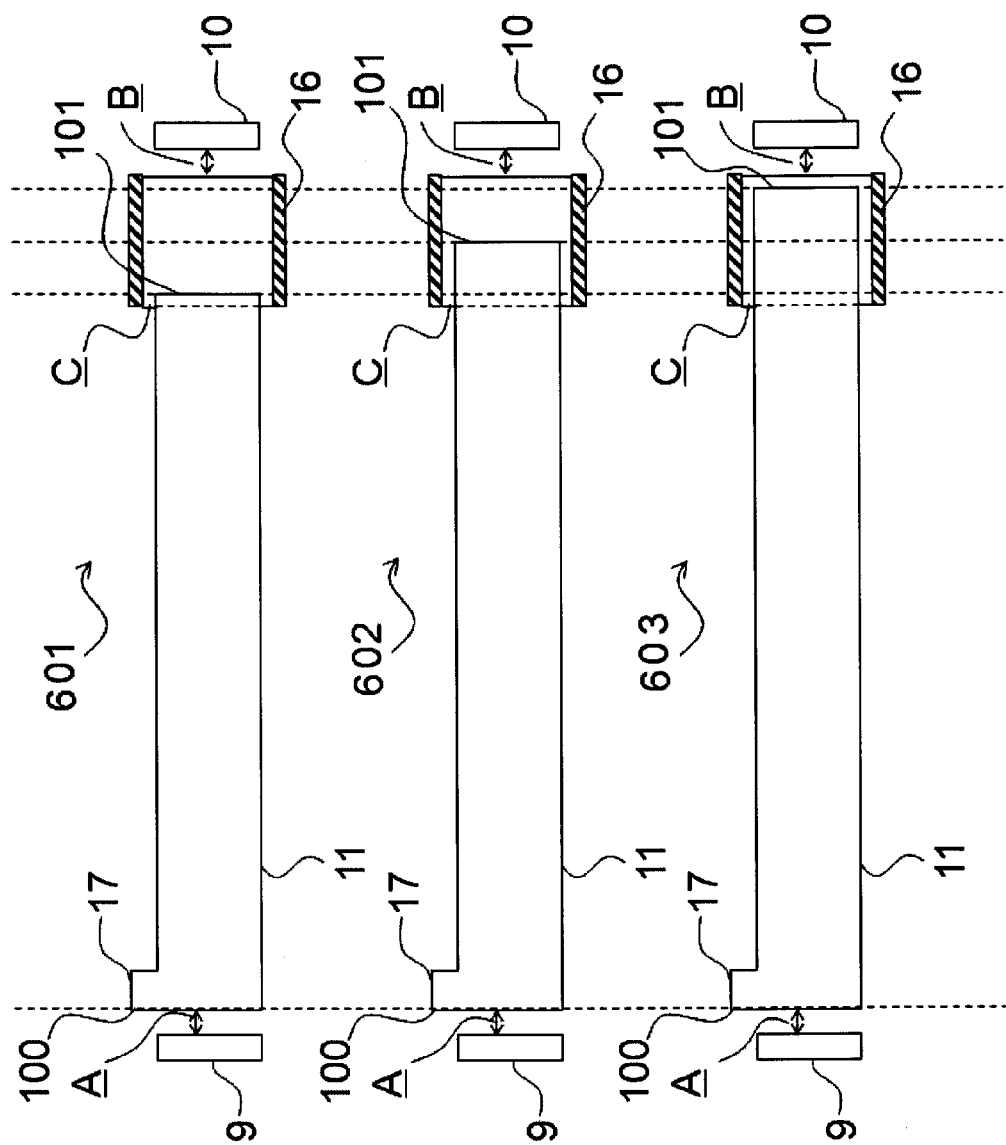
FIG. 6 is a schematic diagram showing a first gap A and a second gap B in the image sensor unit 4 according to the first embodiment.

FIG. 6 is a schematic diagram showing variations in the dimensions of the first gap A and the second gap B resulting from expansion and contraction of the light guide 11 in the longitudinal direction thereof in the image sensor unit 4 according to the first embodiment. In FIG. 6, a state 601 shows variations in the dimensions of the first gap A and the second gap B resulting from contraction of the light guide 11 in the longitudinal direction thereof. A state 602 shows the first gap A and the second gap B observed when the light guide 11 is inhibited from expanding or contracting in the longitudinal direction thereof. A state 603 shows variations in the dimensions of the first gap A and the second gap B resulting from expansion of the light guide 11 in the longitudinal direction thereof.

Figure 7:
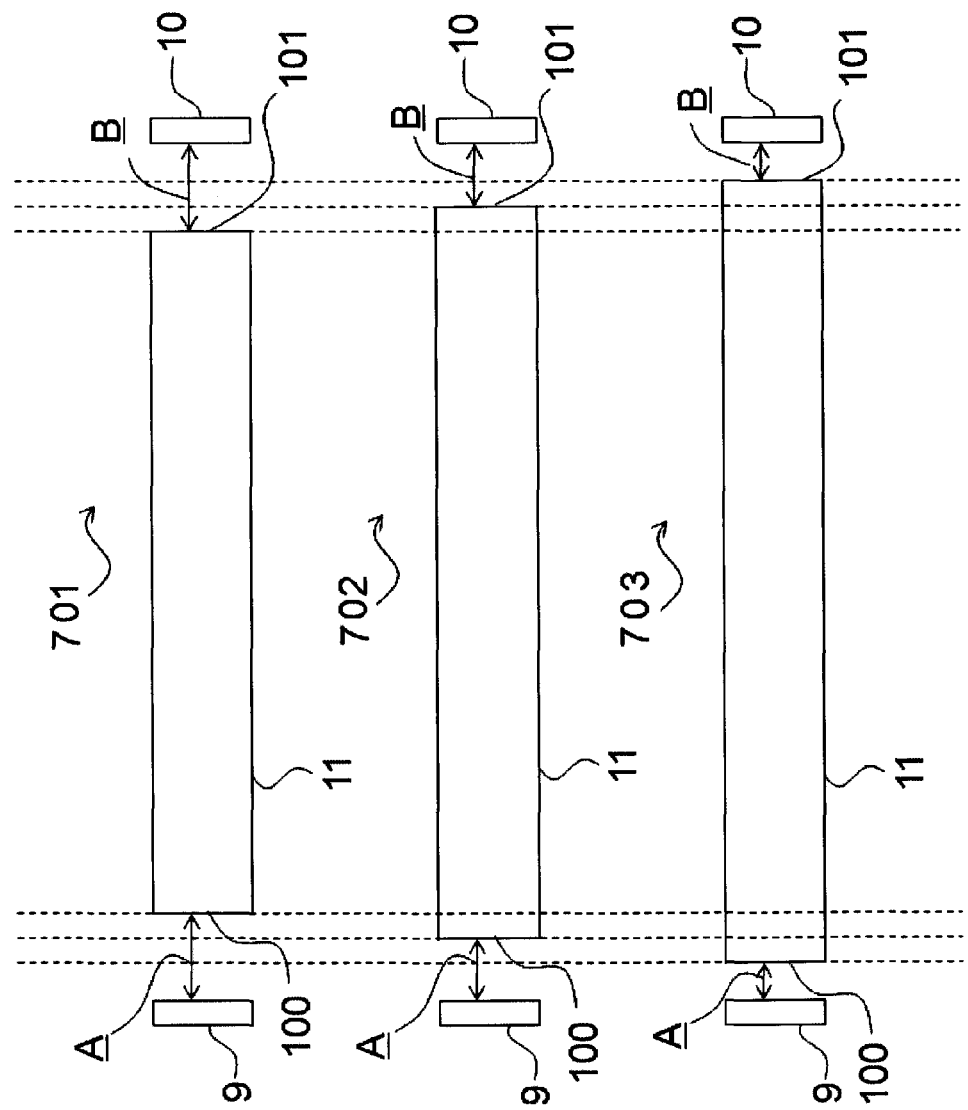
FIG. 7 is a schematic diagram showing a first gap A and a second gap B in a conventional image sensor unit 4.

Furthermore, FIG. 7 is a schematic diagram showing variations in the dimensions of the first gap A and the second gap B resulting from expansion and contraction of the light guide 11 in the longitudinal direction thereof in a conventional image sensor unit 4, that is, the image sensor unit 4 that avoids the use of the light blocking member 16. Also in FIG. 7, members of the conventional image sensor unit 4 which have the same functions as those of the members of the present embodiment are denoted by the same reference numerals for easy understanding. In FIG. 7, a state 701 shows variations in the dimensions of the first gap A and the second gap B resulting from contraction of the light guide 11 in the longitudinal direction thereof. A state 702 shows the first gap A and the second gap B observed when the light guide 11 is inhibited from expanding or contracting in the longitudinal direction thereof. A state 703 shows variations in the dimensions of the first gap A and the second gap B resulting from expansion of the light guide 11 in the longitudinal direction thereof.

As shown in FIG. 6 and FIG. 7, the first gap A is formed between the first light input surface 100 of the light guide 11 and the first light source 9. The second gap B is formed between the second light input surface 101 of the light guide 11 and the second light source 10. Furthermore, as shown in FIG. 6, the air layer C is formed between the light blocking member 16 and the output surface 102 at the end of the light guide 11.

In the above-described configuration, the image sensor unit 4 is hot during a reading operation and is cooled substantially to the room temperature when stopped. Thus, the first gap A and the second gap B are varied in dimension when the light guide 11 expands and contracts in the longitudinal direction thereof in connection with the atmospheric temperature and/or the atmospheric humidity.

This is due to a difference in the ratio of expansion and contraction between the frame 15 and the light guide 11 because polycarbonate is used as the material of the frame 15, whereas acrylic is used as the material of the light guide 11.

Thus, in the image sensor unit 4 without the light blocking member 16, the light guide 11 expands and contracts to vary the first gap A and the second gap B in dimension. This inhibits the design dimension from being maintained. Thus, the illuminance characteristics of the opposite ends of the light guide 11 become unstable. In particular, if the light guide 11 contracts, the first gap A and the second gap B enlarge to cause part of light generated by the light sources to leak. This leads to leakage light.

On the other hand, the image sensor unit 4 according to the first embodiment includes the protruding locking pawl 17 provided at the end of the light guide 11 which corresponds to the first light input surface 100 and the recessed locking portion 18 formed in the frame 15 and in which the locking pawl 17 of the light guide 11 is locked. This indicates that the fixed end is provided on the first light input surface 100 side of the light guide 11, whereas the free end is provided on the second light input surface 101 side of the light guide 11.

Moreover, the light blocking member 16 is slidably loosely inserted into the position where the light blocking member 16 covers the longitudinal end of the light guide 11 which corresponds to the second light input surface 101.

In this configuration, since the locking position between the locking pawl 17 and the locking portion 18 serves as a fixed end, a dimensional variation caused by the longitudinal expansion and contraction of the light guide 11 resulting from a variation in temperature and/or humidity starts at the locking position between the locking pawl 17 and the locking portion 18.

Thus, a dimensional variation is allowed to occur only at the free end. This allows the impact of the expansion and contraction to escape toward the free end, while preventing a possible variation in the dimension of the first gap A corresponding to the fixed end. As a result, the design dimension is maintained on the first light input surface 100 side of the light guide 11.

Furthermore, a variation in the dimension of the free end side occurs in the light blocking member 16 (a variation in the dimension of the free end side can be retained in the light blocking member 16). Thus, the design dimension is substantially maintained on the second light input surface 101 side of the light guide 11 by preventing a possible variation in the dimension of the second gap B between the second light source 10 and the end surface of the light blocking member 16 provided on the light guide 11.

Additionally, the inner diameter of the end surface of the light guide 11 which corresponds to the second light input surface 101 and the inner diameter of the end of the light blocking member 16 are each set equal to or larger than the range of expansion and contraction caused by a variation in the dimension of the light guide 11 resulting from a variation in temperature and/or humidity.

In addition, the widthwise dimension is sufficiently smaller than the longitudinal dimension. Thus, the air layer C is subjected to only a minor dimensional variation.

In the present embodiment, even if expansion and contraction occurs in the longitudinal direction of the light guide 11 as a result of, for example, a variation in atmospheric temperature and/or atmospheric humidity, the design dimensions of the first gap A and the second gap B can be maintained. This enables possible leakage light to be prevented, allowing the illuminance in the vicinity of the first light input surface 100 and the second light input surface 101 to be kept substantially uniform. Thus, the illuminance characteristic can be stabilized all over the relevant area in the main scanning direction. Therefore, stable image quality is obtained.

Furthermore, the light blocking member 16, which is substantially cylindrical, can cover the entire circumference of the end of the light guide 11. This allows light to be more efficiently blocked.

In addition, since the air layer C provided between the light blocking member 16 and the light guide 11 prevents light from being absorbed by a contact surface formed by the possible close contact between the light blocking member 16 and the light guide 11. Thus, light can be reflected inside the light guide 11, allowing light from the second light source 10 to be more efficiently guided.

Furthermore, the slidable loose insertion of the light blocking member 16 allows the contact between the light blocking member 16 and the light guide 11 to be suppressed even when the light guide 11 expands on heating or absorption of humidity. This enables the light guide 11 to be prevented from suffering a crack, wear, and the like.

Additionally, with the light blocking member 16 attached to the end of the light guide 11, the inside dimension between the first light input surface 100 and the end of the light blocking member 16 is equal to or larger than the range of expansion and contraction caused by a dimensional variation resulting from a variation in temperature and/or humidity. Thus, even with variation in the longitudinal dimension of the light guide 11 caused by a variation in atmospheric temperature and/or atmospheric humidity, the interference between the second light input surface 101 and the second light source 10 can be avoided. As a result, possible damage to these components can be prevented.

In addition, since the light blocking member 16 is positioned so as to cover the longitudinal end of the light guide 11 which corresponds to the second light input surface 101, inexpensive commercially available LEDs can be used for the first light source 9 and the second light source 10. Therefore, costs can be reduced.

Moreover, since the light blocking member 16 is formed of a synthetic resin with a self-lubricating property, for example, ultrahigh molecular weight polyethylene, polyacetal, polyamide, or polybutylene terephthalate, the friction and wear between the light blocking member 16 and the light guide 11 can be reduced. This enables the light guide 11 to be prevented from being, for example, damaged or worn.

Furthermore, since the light blocking member 16 is formed of a synthetic resin containing a solid lubricant as a result of coating with a fluorine resin, molybdenum disulfide, or the like, the light guide 11 can be prevented from suffering a crack, wear, and the like, with costs prevented from increasing.

(Second Embodiment)

Figure 8:
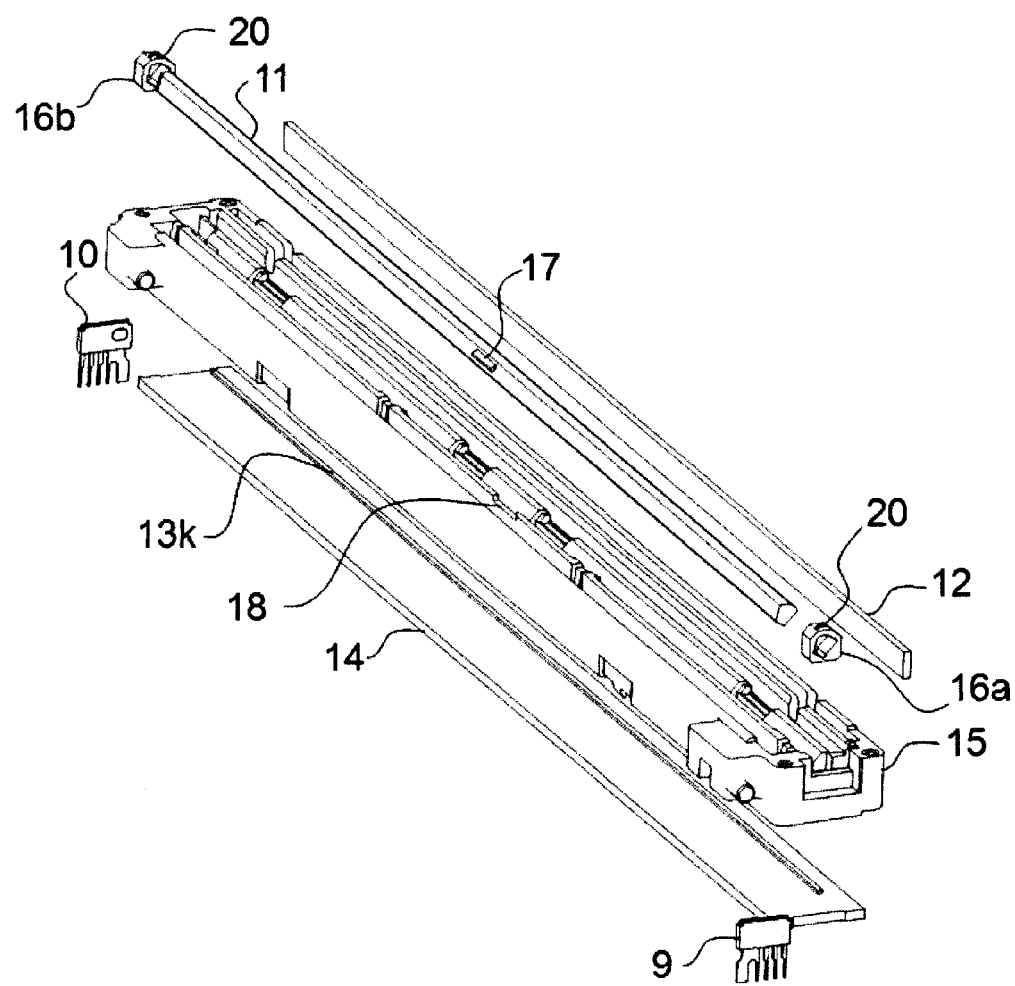
FIG. 8 is a perspective view showing a configuration of the image sensor unit 4 according to a second embodiment.
Figure 9:
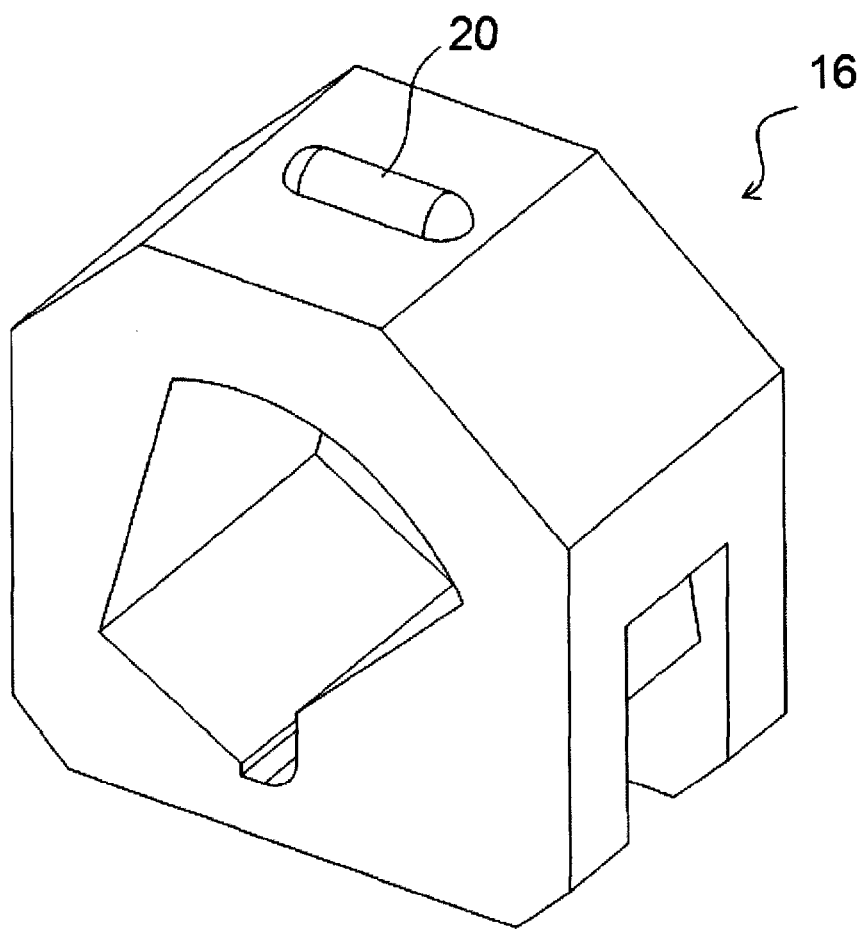
FIG. 9 is a perspective view showing the detailed shape of a light blocking member 16 according to a second embodiment.

FIG. 8 is a perspective view showing a configuration of an image sensor unit 4 according to a second embodiment to which the present invention is applicable. FIG. 9 is a perspective view showing the detailed shape of a light blocking member 16 according to the second embodiment.

Members of the second embodiment which provide the same functions as those in the above-described first embodiment are denoted by the same reference numerals and will not be described below.

The light blocking member 16 includes a first light blocking member 16a and a second light blocking member 16b positioned so as to cover the respective longitudinally opposite ends of the image sensor unit 4. Each of the light blocking members 16a and 16b has an opening shape substantially similar to the cross-sectional shape of the light guide 11 perpendicular to the longitudinal direction thereof. Each of the light blocking members 16a and 16b is formed like a cylinder into which the light guide 11 can be inserted.

A protruding locking pawl is shown by reference numeral 17 and provided integrally with a substantially central portion of the light guide 11 in the longitudinal direction thereof. A recessed locking portion is shown by reference numeral 18 and formed in a substantially central portion of a light guide holding section 19 provided in a frame 15. Thus, when the light guide 11 is attached to the frame 15, the central portion of the light guide 11 which includes the locking pawl 17 serves as a fixed portion, whereas the opposite ends of the light guide 11 serve as free ends.

A projection is shown by reference numeral 20 and proved on the top surface of each of the first light blocking member 16a and the second light blocking member 16b.

The projection 20 has a height such that when the light guide 11 is attached to the frame 15, the projection 20 projects from the top surface of the frame 15.

In this configuration, the first light blocking member 16a and the second light blocking member 16b are slidably loosely inserted, through an air layer C, into respective positions where the first light blocking member 16a and the second light blocking member 16b cover the respective longitudinally opposite ends of the light guide 11.

Thus, when the image sensor unit 4 is housed in a housing 1, each of the first light blocking member 16a and the second light blocking member 16b is arranged between platen glass 2 and the image sensor unit 4.

At this time, the image sensor unit 4 comes into abutting contact with the bottom surface of the platen glass 2 at the opposite ends of top surface thereof. The first light blocking member 16a and the second light blocking member 16b come into abutting contact with the bottom surface of the platen glass 2 via the projections 20.

This means that the first light blocking member 16a and the second light blocking member 16b function as spacers.

The number and shape of the projections 20 are not limited to those in the present embodiment.

Figure 10:
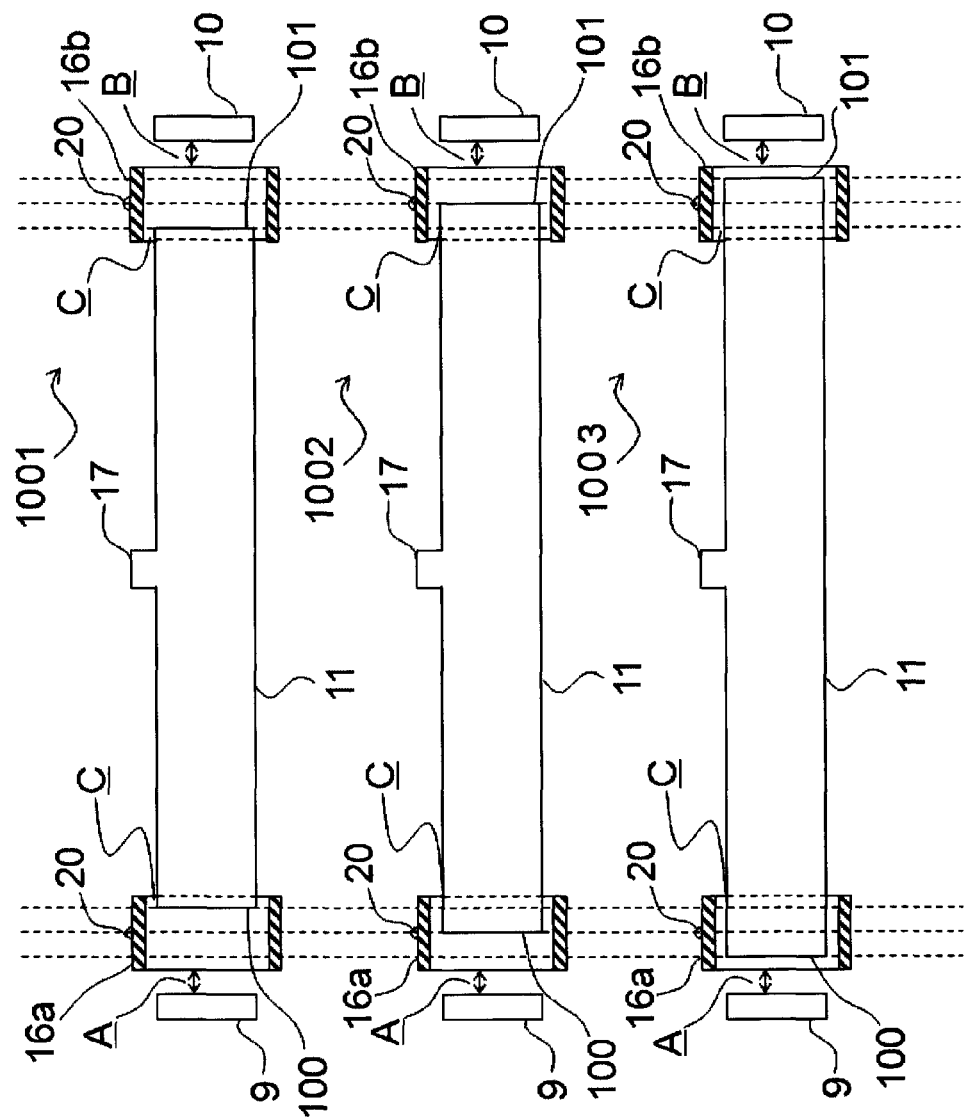
FIG. 10 is a schematic diagram showing a first gap A and a second gap B in the image sensor unit 4 according to the second embodiment.

FIG. 10 is a schematic diagram showing variations in the dimensions of a first gap A and a second gap B resulting from expansion and contraction of the light guide 11 in the longitudinal direction thereof in the image sensor unit 4 according to the second embodiment. In FIG. 10, a state 1001 shows variations in the dimensions of the first gap A and the second gap B resulting from contraction of the light guide 11 in the longitudinal direction thereof. A state 1002 shows the first gap A and the second gap B observed when the light guide 11 is inhibited from expanding or contracting in the longitudinal direction thereof. A state 1003 shows variations in the dimensions of the first gap A and the second gap B resulting from expansion of the light guide 11 in the longitudinal direction thereof.

As shown in FIG. 10, the first gap A is formed between a first light input surface 100 of the light guide 11 and a first light source 9. The second gap B is formed between a second light input surface 101 of the light guide 11 and a second light source 10. In this case, the first gap A and the second gap B are the same in length.

In the image sensor unit 4 according to the second embodiment, the protruding locking pawl 17 is provided on the central portion of the light guide 11. The recessed locking portion 18 is formed in the frame 15 so that the locking pawl 17 can be locked in the recessed locking portion 18. This indicates that the central portion of the light guide 11 serves as a fixed portion, whereas the opposite ends of the light guide 11 serve as free ends.

Moreover, the first light blocking member 16a and the second light blocking member 16b are slidably loosely inserted into the respective positions where the first light blocking member 16a and the second light blocking member 16b cover the respective longitudinally opposite ends of the light guide 11.

In this configuration, since the locking position between the locking pawl 17 and the locking portion 18 serves as a fixed end, a dimensional variation caused by the longitudinal expansion and contraction of the light guide 11 resulting from a variation in temperature and/or humidity starts at the locking position between the locking pawl 17 and the locking portion 18.

This indicates that an equal dimensional variation at the opposite ends of the light guide 11 causes a dimensional variation inside the light blocking member 16 at the first light input surface 100 and at the second light input surface 101 (a dimensional variation occurring on the free end side can be retained in the first light blocking member 16a and the second light blocking member 16b). This in turn enables prevention of a variation in the dimension of the first gap A between the first light source 9 and the end surface of the first light blocking member 16a provided on the light guide 11 and in the dimension of the second gap B between the second light source 10 and the end surface of the second light blocking member 16b provided on the light guide 11. Therefore, the design dimension can be substantially maintained.

The inner diameter of each of the end surfaces of the light guide 11 which correspond to the first light input surface 100 and the second light input surface 101, respectively, and the inner diameter of each of the ends of the first and second light blocking members 16a and 16b are each set equal to or larger than the range of expansion and contraction caused by a variation in the dimension of the light guide 11 resulting from a variation in temperature and/or humidity.

Furthermore, the expansion and contraction occurring in the light guide 11 are distributed between the opposite ends thereof. Thus, the range of expansion and contraction occurring at each of the ends of the light guide 11 is half the range of expansion and contraction occurring in the light guide 11. Hence, compared to the case where only one end serves as a free end, the present embodiment allows the first light blocking member 16a and the second light blocking member 16b to be reduced in length in the main scanning direction.

In the present embodiment, even if expansion and contraction occurs in the longitudinal direction of the light guide 11 as a result of, for example, a variation in atmospheric temperature and/or atmospheric humidity, the design dimensions of the first gap A and the second gap B can be maintained. This enables possible leakage light to be prevented, allowing the illuminance in the vicinity of the first light input surface 100 and the second light input surface 101 to be kept substantially uniform. Thus, the compared to the case where only one end serves as a free end, the present embodiment allows expansion and contraction occurring in the light guide 11 to be distributed between the opposite ends thereof. Consequently, the range of expansion and contraction occurring at each of the ends of the light guide 11 is half the range of expansion and contraction occurring in the light guide 11. This allows a further variation in atmospheric temperature and/or atmospheric humidity to be coped with, allowing the illuminance characteristic to be stabilized all over the relevant area in the main scanning direction. Therefore, more stable image quality is obtained.

Furthermore, the first light blocking member 16a and second light blocking member 16b, which are substantially cylindrical, can cover the entire circumference of the respective opposite ends of the light guide 11. This allows light to be more efficiently blocked.

In addition, since the air layer C provided between the light guide 11 and each of the first light blocking member 16a and the second light blocking member 16b prevents light from being absorbed by a contact surface formed by the possible close contact between the light guide 11 and the first light blocking member 16a or the second light blocking member 16b. Thus, light can be reflected inside the light guide 11, allowing light from the first light source 9 and the second light source 10 to be more efficiently guided.

Furthermore, the slidable loose insertion of each of first the light blocking member 16a and the second light blocking member 16b allows the contact between the light guide and each of the first light blocking member 16a and the second light blocking member 16b to be suppressed even when the light guide 11 expands on heating or absorption of humidity. This enables the light guide 11 to be prevented from suffering a crack, wear, and the like.

Additionally, with the first light blocking member 16a and the second light blocking member 16b attached to the respective opposite ends of the light guide 11, the inside dimension between the first light input surface 100 and the end of the first light blocking member 16a and the inside dimension between the second light input surface 101 and the end of the second light blocking member 16b are each equal to or larger than the range of expansion and contraction caused by a dimensional variation resulting from a variation in temperature and/or humidity. Thus, even with variation in the longitudinal dimension of the light guide 11 caused by, for example, a variation in atmospheric temperature and/or atmospheric humidity, the interference between the first light input surface 100 and the first light source 9 and between the second light input surface 101 and the second light source 10 can be avoided. As a result, possible damage to these components can be prevented.

In addition, since the first light blocking member 16a and the second light blocking member 16b are positioned so as to cover the respective longitudinally opposite ends of the light guide 11, inexpensive commercially available LEDs can be used for the first light source 9 and the second light source 10. Therefore, costs can be reduced.

Furthermore, the projection 20 is provided on the top surface of each of the first light blocking member 16a and the second light blocking member 16b. The projection 20 has a height such that when the light guide 11 is attached to the frame 15, the projection 20 projects from the top surface of the frame 15. Thus, the first light blocking member 16a and the second light blocking member 16b can function as spacers. This enables a reduction in the area of contact with the bottom surface of the platen glass 2 and thus in frictional resistance, while allowing the contact position to be fixed. Hence, not only the operation of the image sensor unit 4 can be stabilized but also the distance between the bottom surface of the platen glass 2 and the image sensor unit 4 can be maintained constant.

Moreover, the locking pawl 17, provided integrally with the substantially central portion of the light guide 11 in the longitudinal direction thereof, can be used as an inflow port for a resin during ejection molding. Thus, when the light guide 11 is molded, the resin can be injected evenly toward the opposite ends of the light guide 11 around the substantially central portion thereof. This allows the moldability of the light guide 11 to be improved.

The present invention includes the locking means for allowing the one end of the light guide and the support to be locked together, and the light blocking member configured to cover the another end of the light guide. Thus, even if expansion and contraction occurs in the longitudinal direction of the light guide as a result of, for example, a variation in atmospheric temperature and/or atmospheric temperature, the designed dimension between the light guide and each of the light sources can be maintained. This enables possible leakage light to be prevented, allowing an illuminance characteristic to be stabilized all over the relevant area in a main scanning direction.

The present invention includes the locking means for allowing the substantially central portion of the light guide and the support to be locked together, and the light blocking members configured to cover the respective opposite ends of the light guide. Thus, even if expansion and contraction occurs in the longitudinal direction of the light guide as a result of, for example, a variation in atmospheric temperature and/or atmospheric temperature, the designed dimension between the light guide and each of the light sources can be maintained. This enables possible leakage light to be prevented, allowing the illuminance characteristic to be stabilized all over the relevant area in the main scanning direction.

The present invention is an effective technique for an image reader for an image scanner, a facsimile machine, a copier, or the like.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:

1. An image sensor unit comprising:
   a plurality of light sources;
   a sensor substrate with a plurality of photoelectric conversion elements mounted thereon;
   a rod-like light guide with the light sources arranged close to respective opposite ends thereof in a longitudinal direction to guide light from the light sources to illuminate an illumination target;
   an image forming element configured to form light reflected from the illumination target into an image on the sensor substrate;
   a support with each of the light sources, the sensor substrate, the light guide, and the image forming element attached thereto; and
   a locking element configured to allow one end of the light guide and the support to be locked together, and a light blocking member configured to cover another end of the light guide.

2. The image sensor unit according to claim 1, wherein the light blocking member is shaped like a cylinder with an opening shape substantially similar to a cross-sectional shape of the light guide perpendicular to the longitudinal direction thereof.

3. The image sensor unit according to claim 1, wherein an air layer is formed between the light blocking member and the light guide.

4. The image sensor unit according to claim 1, wherein the light blocking member is formed of a synthetic resin with a self-lubricating property.

5. The image sensor unit according to claim 1, wherein the light blocking member is formed of a synthetic resin containing a solid lubricant.

6. An image sensor unit comprising:
a plurality of light sources;
a sensor substrate with a plurality of photoelectric conversion elements mounted thereon;
a rod-like light guide with the light sources arranged close to respective opposite ends thereof in a longitudinal direction to guide light from the light sources to illuminate an illumination target;
an image forming element configured to form light reflected from the illumination target into an image on the sensor substrate;
a support with each of the light sources, the sensor substrate, the light guide, and the image forming element attached thereto; and
a locking element configured to allow a substantially central portion of the light guide and the support to be locked together, and light blocking members configured to cover the respective opposite ends of the light guide.

7. The image sensor unit according to claim 6, wherein each of the light blocking members is shaped like a cylinder with an opening shape substantially similar to a cross-sectional shape of the light guide perpendicular to the longitudinal direction thereof.

8. The image sensor unit according to claim 6, wherein an air layer is formed between each of the light blocking members and the light guide.

9. The image sensor unit according to claim 6, wherein each of the light blocking members is formed of a synthetic resin with a self-lubricating property.

10. The image sensor unit according to claim 6, wherein each of the light blocking members is formed of a synthetic resin containing a solid lubricant.

11. An image reader using an image sensor unit comprising:
a plurality of light sources;
a sensor substrate with a plurality of photoelectric conversion elements mounted thereon;
a rod-like light guide with the light sources arranged close to respective opposite ends thereof in a longitudinal direction to guide light from the light sources to illuminate an illumination target;
an image forming element configured to form light reflected from the illumination target into an image on the sensor substrate;
a support with each of the light sources, the sensor substrate, the light guide, and the image forming element attached thereto; and
a locking element configured to allow one end of the light guide and the support to be locked together and a light blocking member configured to cover another end of the light guide, or a locking element configured to allow a substantially central portion of the light guide and the support to be locked together and light blocking members configured to cover the respective opposite ends of the light guide.

12. The image reader according to claim 11, wherein the light blocking member is shaped like a cylinder with an opening shape substantially similar to a cross-sectional shape of the light guide perpendicular to the longitudinal direction thereof.

13. The image reader according to claim 11, wherein an air layer is formed between the light blocking member and the light guide.

14. The image reader according to claim 11, wherein the light blocking member is formed of a synthetic resin with a self-lubricating property.

15. The image reader according to claim 11, wherein the light blocking member is formed of a synthetic resin containing a solid lubricant.

* * * * *